United States Patent
Bishop et al.

(10) Patent No.: US 11,301,457 B2
(45) Date of Patent: Apr. 12, 2022

(54) TRANSACTIONAL DATABASE LAYER ABOVE A DISTRIBUTED KEY/VALUE STORE

(71) Applicant: Microsoft Technology Licensing, LLC, Redmond, WA (US)

(72) Inventors: Spencer Alan Bishop, Kirkland, WA (US); Jason Daniel Shay, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 1054 days.

(21) Appl. No.: 14/754,406

(22) Filed: Jun. 29, 2015

(65) Prior Publication Data

US 2016/0378819 A1 Dec. 29, 2016

(51) Int. Cl.
*G06F 16/23* (2019.01)
*G06F 16/22* (2019.01)
(Continued)

(52) U.S. Cl.
CPC .......... *G06F 16/2379* (2019.01); *G06F 16/21* (2019.01); *G06F 16/22* (2019.01); *G06F 16/2365* (2019.01); *G06F 16/27* (2019.01)

(58) Field of Classification Search
None
See application file for complete search history.

(56) References Cited

U.S. PATENT DOCUMENTS

| 5,860,070 | A | 1/1999 | Tow et al. |
| 6,961,865 | B1 * | 11/2005 | Ganesh ............... G06F 11/1474 707/999.202 |
| 7,647,503 | B2 | 1/2010 | Moskowitz |

(Continued)

FOREIGN PATENT DOCUMENTS

| CN | 102446226 A | 5/2012 |
| CN | 102682071 A | 9/2012 |

(Continued)

OTHER PUBLICATIONS

International Search Report and Written Opinion issued in PCT Application No. PCT/US2016/039922, dated Nov. 23, 2016.
Escriva, et al., "Warp: Lightweight Multi-Key Transactions for Key-Value Stores", In Technical Report, Retrieved on: Mar. 24, 2015, 14 pages.

(Continued)

*Primary Examiner* — Van H Oberly
(74) *Attorney, Agent, or Firm* — Buckley, Maschoff & Talwalkar LLC

(57) ABSTRACT

A computing system is configured to be coupled to a remote storage system. The remote storage system comprises a key/value store. The computing system is configured to perform transactions on data stored at the remote storage system. The system includes a database client. The database client includes an interface configured to allow a user to request database operations using the database client. The system further includes a database engine coupled to the database client. The database engine is configured to receive requests for database operations from the database client. The database engine is further configured to obtain and operate on transaction state stored as one or more key/value pairs in the key/value store at the remote storage system from the remote storage system. The database engine is configured to transactionally perform data operations, using (Continued)

the transaction state, on one or more data key/value pairs in the key/value store.

2 Claims, 6 Drawing Sheets

(51) Int. Cl.
*G06F 16/27* (2019.01)
*G06F 16/21* (2019.01)

(56) References Cited

U.S. PATENT DOCUMENTS

| | | | |
|---|---|---|---|
| 9,348,883 B2 | 5/2016 | Gale et al. | |
| 2013/0036136 A1* | 2/2013 | Horii | G06F 16/2343 707/770 |
| 2013/0060742 A1* | 3/2013 | Chang | G06F 16/2365 707/704 |
| 2013/0110767 A1 | 5/2013 | Tatemura et al. | |
| 2013/0151889 A1 | 6/2013 | Markus | |
| 2013/0290243 A1 | 10/2013 | Hazel et al. | |
| 2013/0290283 A1 | 10/2013 | Fang et al. | |
| 2014/0156618 A1* | 6/2014 | Castellano | G06F 16/2358 707/703 |
| 2014/0172898 A1 | 6/2014 | Aguilera et al. | |
| 2014/0236913 A1 | 8/2014 | Chakradhar et al. | |
| 2014/0310259 A1* | 10/2014 | Tian | G06F 16/2471 707/718 |
| 2015/0112999 A1 | 4/2015 | Sivasubramanian et al. | |

FOREIGN PATENT DOCUMENTS

| | | |
|---|---|---|
| CN | 103064964 A | 4/2013 |
| CN | 103106158 A | 5/2013 |
| CN | 103268318 A | 8/2013 |
| CN | 103577588 A | 2/2014 |
| CN | 103782574 A | 5/2014 |
| CN | 103890709 A | 6/2014 |
| CN | 104239357 A | 12/2014 |
| CN | 104239572 A | 12/2014 |
| CN | 104504158 A | 4/2015 |
| CN | 104793988 A | 7/2015 |
| CN | 107710203 A | 2/2018 |
| JP | 2007334759 A | 12/2007 |
| WO | 2013041852 A2 | 3/2013 |
| WO | 2014008495 A2 | 1/2014 |

OTHER PUBLICATIONS

Padhye, et al., "Scalable Transaction Management with Snapshot Isolation on Cloud Data Management Systems", In Proceedings of IEEE 5th International Conference on Cloud Computing, Jun. 24, 2012, 8 pages.
Gesher, Ari., "AtlasDB: Transactions for Distributed Key-Value Stores (Part I)", Published on: Jun. 19, 2014 Available at: https://www.palantir.com/2014/06/atlasdb-transactions-for-distributed-key-value-stores-part-i/.
Kar, Saroj., "FoundationDB extends NoSQL database to gear up for Internet of Things", Published on: Dec. 16, 2014 Available at: http://siliconangle.com/blog/2014/12/16/foundationdb-extends-nosql-database-to-gear-up-for-internet-of-things/.
"Scalaris, a Distributed Transactional key-value store", Published on: Oct. 23, 2014 Available at: http://code.google.com/p/scalaris/.
"Multi-Model Database—FoundationDB", Retrieved on: Mar. 24, 2015 Available at: https://foundationdb.com/.
Dey, Akon., "Scalable Transactions across Heterogeneous NoSQL KeyValue Data Stores", In Proceedings of the VLDB Endowment, vol. 6, No. 12, Aug. 26, 2013, pp. 1434-1439.
Escriva, et al., "Warp: Multi-Key Transactions for Key-Value Stores", In Technical Report, May 2013, 15 pages.
Polo, et al., "Enabling Distributed Key-Value Stores with Low Latency-Impact Snapshot Support", In Proceedings of 12th IEEE International Symposium on Network Computing and Applications, Aug. 22, 2013, pp. 65-72.
Zhang, et al., "Supporting Multi-Row Distributed Transactions with Global Snapshot Isolation using Bare-Bones HBase", In Proceedings of 11th IEEE/ACM International Conference on Grid Computing, Oct. 25, 2010, pp. 177-184.
Sarathi, Partha., "A deep dive into NoSQL: A complete list of NoSQL databases", Published on: Jul. 21, 2014 Available at: http://www.bigdata-madesimple.com/a-deep-dive-into-nosql-a-complete-list-of-nosql-databases/.
"Second Written Opinion Issued in PCT Application No. PCT/US2016/039922", dated May 29, 2017, 6 Pages.
"International Preliminary Report on Patentability issued in PCT Application No. PCT/US2016/039922," dated Oct. 11, 2017.
"First Office Action and Search Report Issued in Chinese Patent Application No. 201680039150.0", dated Aug. 13, 2020, 13 Pages.
"Notice of Allowance and Search Report Issued in Chinese Patent Application No. 201680039150.0", dated Feb. 18, 2021, 8 Pages.

* cited by examiner

| | PartitionKey | RowKey | Deadline | Status |
|---|---|---|---|---|
| 214 | E8BBD359-2ED6-4FAF-9F24 | 0TxS:GC:Consider | 7/10/2014 19:11 | |
| 216 | E8BBD359-2ED6-4FAF-9F24 | 0TxS:GC:Scheduled | | |
| | PartitionKey | RowKey | | |
| 212 | E8BBD359-2ED6-4FAF-9F24 | 0TxS:Tx | Garbage | |
| | PartitionKey | RowKey | | |
| 208-1 | E8BBD359-2ED6-4FAF-9F24 | GC:000000000000000004:R:R:E8BBD359-2ED6-4FAF-9F24-E02DB3942E25 | Del | |
| | E8BBD359-2ED6-4FAF-9F24 | GC:000000000000000006:R:R:E8BBD359-2ED6-4FAF-9F24-E02DB3942E25 | 6 | |
| | E8BBD359-2ED6-4FAF-9F24 | GC:000000000000000006:I:FID:00:6400000000000000000000000000000000 | FALSE | |
| | E8BBD359-2ED6-4FAF-9F24 | GC:000000000000000006:I:GID:81CF9C72D2D40D03F88EF3E7DE293440B6373E2EC | FALSE | |
| | E8BBD359-2ED6-4FAF-9F24 | GC:000000000000000006:I:PID_N:64000000000000000000000000000000:DIR1 | FALSE | |
| | E8BBD359-2ED6-4FAF-9F24 | GC:000000000000000006:I:TCK:000000000000000004:81CF9C72D2D40D03F88EF3E7 | FALSE | |
| | PartitionKey | RowKey | | |
| 204-1 | E8BBD359-2ED6-4FAF-9F24 | I:FID:00:6400000000000000000000000000000000:FFFFFFFFFFFFFFF9 | Del | |
| | E8BBD359-2ED6-4FAF-9F24 | I:GID:81CF9C72D2D40D03F88EF3E7DE293440B6373E2EC5DA8851:FFFFFFFFFFFFFFFF | FALSE | |
| | E8BBD359-2ED6-4FAF-9F24 | I:PID_N:64000000000000000000000000000000:DIR1:FFFFFFFFFFFFFFF9 | FALSE | |
| | E8BBD359-2ED6-4FAF-9F24 | I:TCK:000000000000000004:81CF9C72D2D40D03F88EF3E7DE293440B6373E2EC5D | FALSE | |

*Figure 2*

| dline | Status | TxConsider | | TxLastRun | TxReady | UnCmTx | Wlease |
|---|---|---|---|---|---|---|---|
| 6 | Considering | 0 | | 0 | 0 | System.Byte[] | 7/10/2014 19:11 |
| | CurTx | 20 | | | | | |
| | Tx | 4 | Otx | | | | |
| | | 6 | 4 | | | | |
| | | 6 | | | | | |
| | | 6 | | | | | |
| | | 6 | | | | | |
| | | 6 | | | | | |
| | Tx | 6 | Data0 | | | | |
| | | 6 | System.Byte [ ] | | | | |
| | | 6 | System.Byte [ ] | | | | |
| | | 6 | System.Byte [ ] | | | | |

| Partition | RowKey | CurTx | UnCmTx | Wlease |
|---|---|---|---|---|
| E8BBD359 | OTxS:Tx | 19 | 18 | |

404 →

| Partition | RowKey | Del | Tx | Data0 |
|---|---|---|---|---|
| E8BBD359 | I:N:FILENAME.TXT:FFFFFFFFFFFFFFEB | TRUE | 20 | |
| E8BBD359 | I:N:FILENAME.TXT:FFFFFFFFFFFFFFED | FALSE | 18 | System.Byte[ ] |
| E8BBD359 | I:N:FILENAME.TXT:FFFFFFFFFFFFFFF5 | FALSE | 10 | System.Byte[ ] |
| E8BBD359 | I:N:FILENAME.TXT:FFFFFFFFFFFFFFFA | FALSE | 5 | System.Byte[ ] |
| E8BBD359 | I:N:FILENAME.TXT:FFFFFFFFFFFFFFFB | FALSE | 4 | System.Byte[ ] |

*Figure 4*

TRANSACTIONAL DATABASE LAYER ABOVE A DISTRIBUTED KEY/VALUE STORE

BACKGROUND

Background and Relevant Art

Computers and computing systems have affected nearly every aspect of modern living. Computers are generally involved in work, recreation, healthcare, transportation, entertainment, household management, etc.

Further, computing system functionality can be enhanced by a computing systems' ability to be interconnected to other computing systems via network connections. Network connections may include, but are not limited to, connections via wired or wireless Ethernet, cellular connections, or even computer to computer connections through serial, parallel, USB, or other connections. The connections allow a computing system to access services at other computing systems and to quickly and efficiently receive application data from other computing systems.

Interconnection of computing systems has facilitated cloud based databases. One such class of databases is NoSQL databases. Many NoSQL solutions in the cloud offer the advantages of extreme scalability. However, this is done at the expense of not having features which would typically exist in full-featured database technologies. For example, cloud based NoSQL solutions do not fully support ACID (Atomicity, Consistency, Isolation, Durability) transactions, multiple indexes, and query isolation. For example, in Azure Table Storage available from Microsoft Corporation of Redmond, Wash., transaction support exists to allow multiple rows to be atomically committed, but with limitations of one HTTP round trip, a maximum of 100 rows, and a maximum payload of 4 MB.

The subject matter claimed herein is not limited to embodiments that solve any disadvantages or that operate only in environments such as those described above. Rather this background is only provided to illustrate one exemplary technology area where some embodiments described herein may be practiced.

BRIEF SUMMARY

One embodiment illustrated herein includes a local computing system configured to be coupled to a remote storage system. The remote storage system comprises a key/value store. The computing system is configured to perform transactions on data stored at the remote storage system. The local computing system includes a database client. The database client includes an interface configured to allow a user to request database operations using the database client. The local computing system further includes a database engine coupled to the database client. The database engine is configured to receive requests for database operations from the database client. The database engine is further configured to obtain (from the remote storage system) and operate on transaction state stored as one or more key/value pairs in the key/value store at the remote storage system. The database engine is configured to transactionally perform data operations, using the transaction state, on one or more data key/value pairs in the key/value store.

This Summary is provided to introduce a selection of concepts in a simplified form that are further described below in the Detailed Description. This Summary is not intended to identify key features or essential features of the claimed subject matter, nor is it intended, to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 2 illustrates a schema for a key/value store that includes data rows, transaction state and garbage collection information;

FIG. 4 illustrates how historical versioned data is stored so that snapshot isolation can be achieved using transaction status data stored in a key/value store.

DETAILED DESCRIPTION

Embodiments illustrated herein may include functionality which provides ACID (Atomicity, Consistency, Isolation, Durability) transactional support on top of a key/value store. In particular, embodiments can be configured to address the challenge of interacting with a highly scalable key/value remote store distributed across multiple machines and accessible by multiple clients (which each may act as readers and writers on the store), such as Azure Storage available from Microsoft, Corporation of Redmond, Wash. As such, such distributed storage may be used to implement transaction computing in a manner which is similar to traditional full-featured database technologies.

In particular, some embodiments may support ACID transactions on distributed key/value remote storage. This may allow for snapshot isolation for readers, where the readers may be local clients connecting to a distributed key/value remote store. Embodiments may allow for a programming model to be implemented in such environments which uses familiar transaction semantics (e.g., BeginTransaction, CommitTransaction, RollbackTransaction, etc.). Embodiments may be implemented where a transaction can exist and survive across multiple round trips, removing limitations around, row count and overall payload sizes in individual transactions. Embodiments may be implemented such that a single database writer can co-exist with any number of active readers. Embodiments may be implemented where transactions can span multiple physical storage partitions, or even cross storage account boundaries. Embodiments may be implemented where transactions can be transferred between clients (started on one client and continued on another client), which can be useful in distributed cloud service topologies.

Embodiments can solve the problem of enabling transactional computing on key/value store distributed databases by using local clients that are configured to access and modify transaction status information stored as key/value pairs in the key/value store. This allows for the distributed databases to have a simple traditional structure, but that are able to be used in support of advanced transactional computing.

Figure 1:
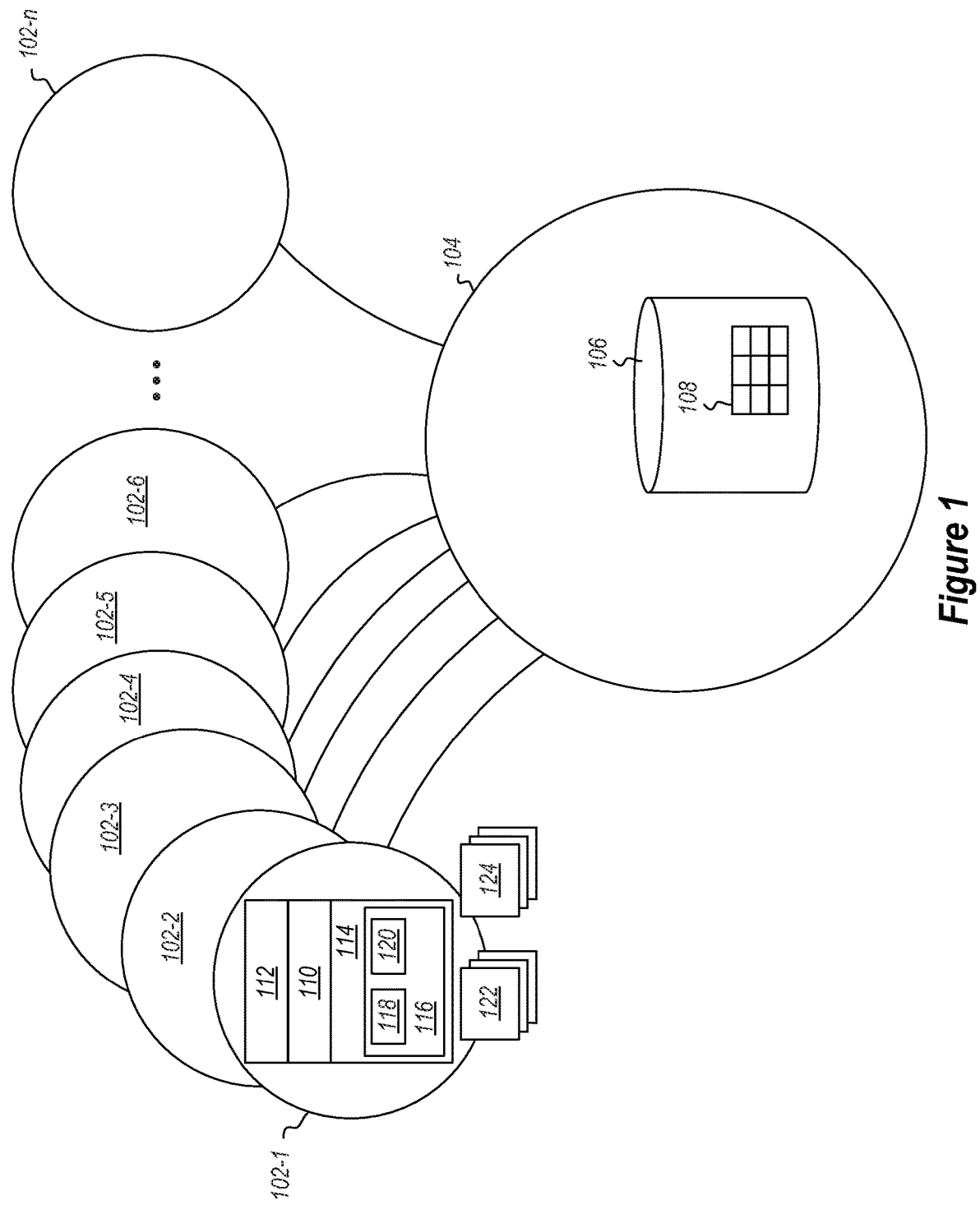
FIG. 1 illustrates local systems coupled to a remote storage system, where the remote storage system includes a key/value store.

Referring now to FIG. 1, an example computing environment 100 implementing such a system is illustrated. The computing environment 100 includes a plurality of local systems 102-1 through 102-n, coupled to a remote storage system 104. The remote storage system 104 may be a distributed and scalable system. Thus, while shown as a single entity, the remote storage system 104 may actually be distributed in various physical locations on various different physical machines. The remote storage system 104 includes a data store 106. The data store 106 includes a key/value store 108. Embodiments implement functionality for performing transactions on data stored at the remote storage system 104 by using the key/value store 108 to store transaction state (in the description of FIG. 2, it will be shown that transaction state can be stored in transaction status rows 202) for use by transaction logic at a local system (such as local system 102-1) when performing transactions on data stored at the remote storage system 104. This is done such that transactions can be performed on the remote storage system 104 by minimizing, or in some cases, eliminating transactional data processing logic to be used by the remote storage system 104. Rather, the logic can be implemented at the local system 102-1.

The following illustrates an example using the local system 102-1. However, it should be appreciated that the principles can be applied to any local system coupled to the remote storage system 104. The local system 102-1 is configured to be coupled to the remote storage system 104. As noted, the remote storage system 104 includes a key/value store 108. The local system 102-1 is configured to perform transactions on data stored at the remote storage system 104. The local system 102-1 includes a database client 110. The database client 110 includes an interface 112 that is configured to allow a user to request database operations using the database client 110. Such users may be processes or systems at the local system 102-1, system administrators, other system coupled to the local system 102-1, etc.

The local system 102-1 includes a database engine 114 coupled to the database client 110. The database engine 114 is configured to receive requests for database operations from the database client 110. The database engine 114 is further configured to perform transactional operations on the data store 106 at the remote storage system 104. In some embodiments, this can be done by the database engine 114 being configured to update various columns in key/value rows of the key/value store 108 to control transactional data operations. For example (as will be illustrated in more detail in conjunction with the description of FIGS. 2, 3 and 4), the database engine is configured to update a write lease column in transaction state stored as one or more key/value rows in the key/value store 108 at the remote storage system to indicate that the database engine has acquired a write lease. The database engine 114 is configured to update a current transaction column in the transaction state stored as one or more key/value rows in the key/value store at the remote storage system to include an identifier identifying a specific transaction that has begun. The database engine 114 is configured to update an uncommitted transaction column in the transaction state stored as one or more key/value rows in the key/value store at the remote storage system to include an identifier identifying the specific transaction as being an uncommitted transaction. The database engine 114 is configured to perform one or more data operations (i.e. reading or writing) on one or more key/value pairs in the key/value store.

Referring to FIG. 2, an example of a portion of key/value store in a multi-version data store is illustrated. FIG. 2 illustrates that the key/value store 108 may be divided into various pieces. In particular, the key/value 108 may include transaction status rows 202. The transaction status rows include transaction state. The transaction status rows 202, as will be discussed in more detail below, include various columns that can include information used to perform transactional data processing as well as to perform garbage collection. In the illustrated embodiment, corresponding transaction rows are included for each versioned row (defined in more detail below) in the key/value store. The key/value store 108 further includes versioned rows 204. Each versioned row holds a single version of a single index of a logical row. In the illustrated example, one logical row is=to N physical rows, one per index. Logical column data is serialized across several physical columns. In the particular example illustrated, each index duplicates the data for the whole logical row. Other implementations may accomplish similar functionality in different ways, such as for example, by providing a pointer to an underlying data row. The key/value store 108 further includes garbage collection rows 208. In the illustrated example, every physical row has a corresponding garbage collection row. The garbage collection rows will be explained in more detail below.

The key/value store 108 further includes a mapping table 210. The mapping table 210 maps reader/writer identifiers to partition keys of versioned tables.

Figure 3:
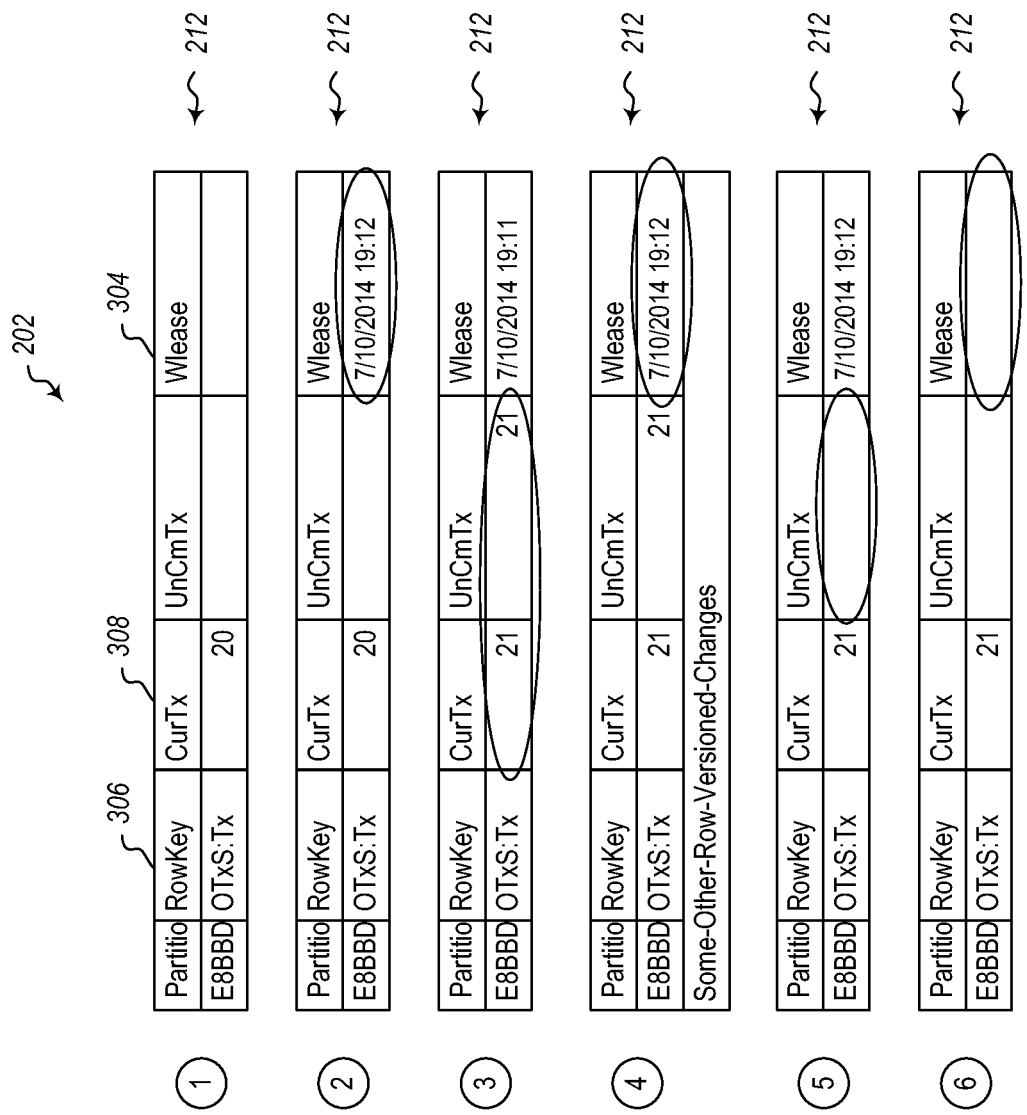
FIG. 3 illustrates progression of transactional data operations over time using transaction state stored as key/value store entries.

Referring now to FIG. 3, a specific example of using transaction state stored in the transaction status rows 202 is illustrated. In particular, FIG. 3 illustrates how a transaction status row 212 changes over time as various transactional data processing actions are performed.

In the example illustrated in FIG. 3, the transaction status row 212 includes a write lease column 304 stored in one or more key/value rows in the key/value store 108 (see FIG. 1). The write lease column 304 can include an indication that a database engine 114 has acquired a write lease. In the example illustrated, this is by providing a timestamp. However, this is not required, and other embodiments may implement this functionality in other ways. In particular, in some embodiments, the timestamp is never read for the time value it represents. Rather, embodiments can just observe that the value does not change for some time period. When the entry has not changed for a significant period of time, the entry can be considered to be expired, and other writers can steal the lease. Thus, the entry does not need to be a timestamp.

The transaction status row 212 further includes a current transaction column 306 stored in one or more key/value rows in the key/value store 108. The current transaction column 306 can include a monotonically increasing identifier identifying a specific transaction that has begun.

The transaction status row 212 further includes an uncommitted transaction list column 308 stored in one or more key/value rows in the key/value store 108. The uncommitted transaction list column 308 can include an identifier identifying the specific transaction as being an uncommitted transaction. The uncommitted transaction list column 308 may include an array, and may include multiple different transactions that are uncommitted. This array can be used for reading data and in garbage collection operations, as will be described in more detail below.

With reference to FIG. 1, the remote storage system 104 is configured to provide the transaction status row 212 (see FIG. 3) stored in the data store 106 to, and receive updated transaction state from a plurality of different local systems (referred to generally as 102). In particular, each of the local systems 102 may have database engines 114 that perform transactional database operations on the data store 106 to read or write data to be operated on. In this way, several local systems 102 can all perform transactional database operations on the data store 106 by reading the transaction status row 212 (see FIG. 3) and providing updated transaction state to the data store 106 without needing to use transactional database logic at the remote storage system, but rather allowing the transactional database logic to be implemented at the local system 102. Additionally, the local systems 102 can coordinate together to perform different parts of a transaction. For example one local system could inform another local system about a transaction, and request that the other local system complete the transaction. If the first local system identifies a transaction identifier to the second local system, then the second local system can use the transaction state in the transaction status row to complete the transaction.

Returning once again to FIG. 3, changes to the transaction state are illustrated as transactional data processing actions are performed. In particular, six different points in time are shown. An example of transactional processing will now be explained for embodiments using the six different points in time. For safety, in the illustrated example, updates to the transaction status rows are made with optimistic concurrency semantics so that racing writers would guarantee only one would succeed.

At point in time 1, an initial state is illustrated. In this initial state no writers (e.g., database engines at local systems) are currently performing transaction data processing actions on the data store row associated with the transaction status row 212. In the initial state illustrated, 20 transactions have occurred in the past, and there are no uncommitted transactions At a point in time 2, a write lease is acquired on the logical data store with the data store row associated with the transaction status row 212. In particular, in the example shown, the write lease column 304 is updated with some data to indicate that a write lease has been taken. In the current example, the write lease column 304 is updated with a date and time stamp.

At a point in time 3, a transaction on the logical data store with the data store row associated with the transaction status row 212 begins. One action that is taken to begin a transaction is to increment a counter in the current transaction column 306 where the counter value is a transaction identifier associated with the transaction. This transaction identifier can be used later to prevent conflicting transactional data processing actions or for garbage collection as will be illustrated in more detail below. The transaction identifier is added to the uncommitted transaction column 308. By having the counter value added to this column, conflicting transactions can be identified. In particular, as will be illustrated in more detail below, when a transaction commits, the transaction identifier is removed from the uncommitted transaction column 308. However, if the transaction does not commit, the transaction identifier is allowed to remain in the uncommitted transaction column 308. This functionality can be used to accomplish snapshot isolation, as will be illustrated in more detail below in conjunction with the description of FIG. 4.

At a point in time 4, embodiments write (in this example) data to the data store row associated with the transaction status row 212. In the illustrated example, the write lease column 304 is updated. This is part of the write lease semantics, so that other writers which are waiting to write will continue waiting because they know the active writer is still writing, rather than steal the lease. Note that this is particular to this example and that other embodiments may update the write lease column 304 outside of a data writing path.

At a point in time 5 the transaction commits. Committing the transaction includes clearing the transaction identifier from the uncommitted transaction column 308. As noted above, if a need to perform a rollback (instead of committing the transaction) occurred, a no-op scenario could be implement which does nothing with the transaction identifier, allowing the transaction identifier (in this case "21") to remain in the uncommitted transaction column 308 by preventing it from being removed. The rollback will be automatic by making use of the versioned database rows, and simply not using versions associated with the transaction identifier. In particular, subsequent transactions are prevented from using data in versioned rows that are associated with a transaction identifier that is included in the uncommitted transaction column.

At a point in time 6 the write lease is released. In this example, this is performed by clearing the write lease column 304. When the write lease column 304 has a non-expired entry in it, other writers will not write to the data store row associated with the transaction status row 212.

Various optimizations, while not shown specifically in the example, could be implemented. For example, acquiring a write lease could be an implicit beginning of the transaction. As another example, commit or rollback could be implicitly begun at the beginning of the next transaction.

Referring now to FIG. 4, an example of how snapshot isolation is achieved is illustrated. In this example, a database engine 114 at a local system 102-1 (see FIG. 1), as a reader reads the transaction status row 212. In the example illustrated, the transaction status structure indicates that the highest transaction number which may have been committed is 19, and that a transaction with an identifier of 18 is uncommitted.

The database engine 114 queries various versioned rows 404. Different versions of the same logical row are associated with transactions 20, 18, 10, 5 and 4, and ordered by the same transaction number, descending. In particular, each of these rows has been appended to the versioned rows 404 as a result of being written in conjunction with executing the associated transaction. Using this information, the current transaction can identify a "snapshot" of data on which to operate in isolation from other transactions.

The following illustrates the anatomy of a rowkey in the examples illustrated. For the example key "I:N:FILE- NAME.TXT:FFFFFFF . . . " "I" is item table, "N" is the 'FileName' index, 'FILENAME.TXT' is the logical value of the index. FFFFFFF . . . is the inverted row version. Thus, the anatomy as generalized is [Table]:[Index]:[IndexValue]:[InvertedVersion]. An alternative representation that may be useful which is more agnostic from indexes (and more about the transaction support), is: [UndecoratedRowKey]:[InvertedVersion] where multiple physical rows with the same UndecoratedRowKey (and different versions) represent multiple versions of the same logical row, through time.

The versioned row associated with transaction number 20 is rejected because it was created after the current transaction (which is transaction number 19). The versioned row associated with transaction number 18 is rejected because it is uncommitted. The versioned row associated with transaction number 10 is accepted because it is the next row that is found before the current transaction and does not appear in the list of uncommitted transactions. The versioned rows associated with transaction numbers 5 and 4 are rejected because only the newest acceptable row is used. Thus, embodiments are able to achieve snapshot isolation for transactions.

Given the specific example illustrated above, a general identification of features along with other specifics related to such features that may be included in various embodiments of the invention are now illustrated.

Embodiments may implement a simplistic 'row versioning' scheme. A transaction status row 212 is defined to hold data about current transaction status. A transaction status will exist once for each once for each transaction scope, and transaction operations cannot read/write data across this boundary.

The transaction status row 212 includes the write lease column 304 which tracks write leases to help enforce a single writer. When a write transaction begins, the writer (e.g. the database engine 114 shown in FIG. 1) will add its current time (or some other value) to this column. There is a global renewal time (e.g., 1 minute), where a writer updates this value to renew its lease. Other writers are expected to wait for at least the global renewal time before preempting a different writer by doing an equality check on an old write lease. If the write lease does not change after the global renewal time, then a different writer can take over the write lease to start a new transaction. An example of write lease tracking is illustrated above using the write lease column 304 illustrated in FIG. 3.

The transaction status row 212 tracks a current transaction number in a current transaction column 306. In the example illustrated, this is the number of the current transaction. For readers, it means any row with a transaction number less than or equal to this value is trustworthy, unless it is in an uncommitted transaction list column 308 (discussed in more detail below). In the illustrated embodiment, for writers, the next transaction that it starts will be this transaction number incremented. An example of tracking a current transaction number is illustrated above using the current transaction column 306.

The transaction status now 212, using the uncommitted transaction list column 308, tracks a list of transactions which exist but are not yet committed. This provides the ability to identify if a particular transaction is committed or not. In the example illustrated, the uncommitted transaction list column 308 is an array of transaction numbers which are not trustworthy. All new write transactions are added to this list, and removed on a successful commit. In some embodiments, such as those using Azure Table columns from Microsoft, Corporation, of Redmond, Wash., there is a limit of 64 k of binary data. This imposes a limit of 8,192 failed transactions before new write transactions can begin, though multiple columns can be used to increase this limit.

Data rows (see e.g., versioned rows 204 in FIG. 2) in the tables of the key/value store 108 are versioned. This means that as data is operated on in the data rows, a new row is created to store the data from the operation, but the previous data (to the extent that it exists) is allowed to remain (until removed by garbage collection) but identified by a different version identifier. In some embodiments, the version identifier is the transaction identifier for the transaction that created the update. For example, a key for a data row may be split into two parts. While, for example, the normal key value would be [KeyVal], then the actual key written to the physical table of the key/value store 108 would be [KeyVal]:[TransactionNumber] where [TransactionNumber] identifies the transaction identifier of the transaction that created the data corresponding to [KeyVal]. Note that embodiments may invert the transaction number for the data row (but not the garbage collection row), as an optimization so that results are returned in the order the queries would use them (i.e., largest transaction number first). Writes to the versioned rows 204 in the key/value store 108 are add operations, irrespective of the logical operation (whether being a Create, Update, or Delete). Note if a single key is written more than once in the same transaction, all additional writes would be physical Update operations. In the examples illustrated, versioned rows 204 in the tables of the key/value store 108 are written as two rows. The main data row 204-1 as described above, and a garbage collection helper row 208-1. For this example, the key written in this case might be GC:[TransactionNumber]:[KeyVal].

Readers (e.g., database engines 114) interact with transactions by reading the transaction status row 212 and persisting it for the duration of the transaction. This single view of the transaction status helps achieve snapshot isolation, as explained in more detail below.

The readers perform all queries as range scans. Even if the query is a point query, the scan reads enough physical row versions for the KeyVal which applies to the query until an acceptable row is found. The query logic of the database engine 114 uses the transaction status row 212 data to identify which physical row(s) returned are valid, based on the snapshot view of the database at the time the transaction begun. Details of how this is achieved will be explained in more detail below.

Embodiments may also include a garbage collection mechanism. The garbage collection mechanism identifies a transaction number which is less than any transaction number currently in use by active readers or writers. The garbage collection mechanism cleans-up all physical data and garbage collection rows which are now stale. That is, physical rows which are unable to be considered valid to any current or future readers or writers. The garbage collection mechanism can be run in the background, or can be run during normal database access in the write path.

The following now illustrates various additional details and examples.

A writer transaction will be given an associated transaction number, which is obtained from the transaction status row 212 when the transaction begins. For example, if this is the initial state of a transaction status row in the transaction status row 212:

| CurTx | UnCmTx | Wlease |
|-------|--------|--------|
| 6     | 1,3    | Null   |

Then a new write transaction will begin a new transaction with a transaction identifier of 7 by making the following modifications:

| CurTx | UnCmTx | Wlease        |
|-------|--------|---------------|
| 7     | 1,3,7  | <Time>        |

The writer (e.g., the database engine 114 in FIG. 1) can then write data rows using a transaction with a transaction identifier of 7. When it is time to commit, the writer will update the transaction status row as follows:

| CurTx | UnCmTx | Wlease           |
|-------|--------|------------------|
| 7     | 1, 3 ~~7~~ | ~~<Time>~~ null |

Note that while done in this example, the write lease does not have to be cleared when the transaction commits. Another write transaction could be started by the same writer immediately without dropping the write lease.

Embodiments can be implemented to ensure that only one writer is actively writing to a set of versioned rows at a time. Note that this one-at-a-time behavior is limited to the data protected by the transaction status row 212 (see FIG. 3).

When a writer is active and a second writer desires to write to the versioned rows of the key/value store, it will read the transaction status row 212 and check the write lease column 304. If a write lease value is present, the second writer will wait for the expiration of a global renewal time before it can determine if the existing transaction is abandoned. If the write lease value has not changed between the first call and the expiration of the global renewal time, the second writer can preempt the first writer's transaction. If the write lease value has changed, then the second writer assumes that the first writer is still active, and continues to wait for another global renewal time.

If the first writer's transaction is still open and the renewal time is approaching, it updates the write lease value in the write lease column 304 to prevent another writer from preempting its transaction.

Updates to the transaction status row 212 use optimistic concurrency via the If-Match header, to ensure another writer has not changed the structure. If an ETAG mismatch occurs, it means another writer has started a transaction. As a result, the first writer's already-open transaction is lost and has been implicitly rolled back. The rollback occurs naturally, because the transaction number will remain on the uncommitted transaction list.

Once a transaction has begun, the writer or reader is given a transaction number, which is used for the duration of the transaction. The table schema allows for row versioning. As such, any logical action which adds a row, modifies a row, or deletes a row will all add a row Note: if a single row is modified multiple in the scope of a single transaction, the table operation becomes an UPDATE of the originally added row to the versioned rows 204 (see FIG. 2). Note that deleted, rows are simply modified to indicate that the physical row should be in a "deleted" state.

As illustrated in FIG. 4, each versioned row includes a partition key column 450 which stores partition identifier values, a row key column 452 which stores row key values concatenated with a transaction number value, a transaction number column 456 which stores transaction number values, a delete column 454 which indicates whether the row is a deleted row or not, and a data column 458 which stores the actual row data. More specifically, the partition identifier value is a value that would be appropriate for the row, independent of row versioning. The row key value is a value that would be appropriate for the row, independent of row versioning. The transaction number value is the transaction number which was assigned to the transaction when it was begun. It is appended to the row key value. The transaction number value used in the row key column 452 is shown for in column 456 to help the reader read the transaction number. Column 456 is typically not included in the database. The transaction number value in the row key column 452 is for garbage collection purposes, not regular query purposes. The delete column 454 includes an indicator of if the row has been deleted, and is treated as if it does not exist in the logical database. The presence of the row in the key/value store is used to suppress accepting any of the non-deleted rows for transactions running at transaction number 20 (in the illustrated example) and above. The data column 458 holds the actual table's contents, serialized as binary and packed into a single column. However, when there are data limits per column, multiple columns may be used to store the data.

A transaction reader achieves snapshot isolation by reading the transaction status row of the transaction status row 212 (see FIG. 4) before interacting with the table data in the versioned rows (see FIG. 4). It will use the combination of the current transaction column 306 and the uncommitted transactions list column 308 to identify what transaction number values are trustworthy.

Data in a versioned row is considered trustworthy if the value in the versioned row ([e.g., TxVal]) is less than or equal to the reader's transaction number ([e.g., TxIsolationVal]) included in the current transaction column 306. An exception to this is when the versioned row's transaction number is in the uncommitted transaction list column 308 (indicating not yet committed, or rolled back). If multiple rows are considered trustworthy, the row with the highest transaction number value is used. Put more formally:
1. [TxVal]>[TxIsolationVal]
    a. The row is from a future transaction, or a transaction in progress.
    b. The value cannot be trusted
2. [TxVal]<=[TxIsolationVal], but [TxVal] is in the uncommitted transaction list
    a. The row is from a rolled back transaction, or a transaction in progress
    b. The value cannot be trusted
3. [TxVal]<=[TxIsolationVal], and [TxVal] is not in the uncommitted transaction list
    a. The value might be trustworthy. Several rows can be in this state, and the row with the largest [TxVal] value is used.
    b. If the row with the largest [TxVal] in this state is marked with [Del]=True, the logical row does not exist.

With this approach a transaction reader achieves snapshot isolation for its reads because it can identify the appropriate row version to trust, and can differentiate between committed, uncommitted, or rolled back transactions.

This approach is can be used for queries whose predicates are contained entirely within the partition key and row key. Queries with other predicates might return rows which do not represent the latest committed transaction number, while omitting rows which represent the latest transaction number. The data column being a binary serialization of all data columns prevents this kind of unsafe query predicate by design. If the transaction reader is also the writer, it trusts its own transaction row data as well, despite its transaction number being on the uncommitted list.

The following now illustrates details with respect to garbage collection. Garbage collection may be performed so that rows from rolled-back transactions are removed. Alternatively, or additionally, garbage collection may be performed so that rows from previously committed transactions can be removed, if there are newer committed transaction rows. Embodiments ensure that in both cases there are no active readers actively using the garbage collected rows, or writers still operating on garbage collection transactions.

A garbage collection system 116 may be included in a database engine 114, and can be divided into several actors, each with their own functionality. For example, the garbage collection system 116 includes a garbage collection scheduler 118. The garbage collection scheduler 118 identifies a cleanup transaction number which is the open upper bound transaction number to cleanup. The garbage collection system 116 includes a garbage collection runner 120. The garbage collection runner 120 performs the garbage collection algorithm, to clean up the key/value store. The garbage collection system 116 works in conjunction with a database writer 122. The database writers 122 write hints to the key/value store, to allow the garbage collection runner 120 to know what to delete. The garbage collection system 116 also works in conjunction with database readers 124. The database readers 124 actively pre-empt garbage collection from running, if they would be impacted by the cleanup transaction number. Garbage collection can run, for example, in two ways. First, garbage collection may run in the background, meaning some scheduled event is actively interacting with the database engine 114, to perform the garbage collection scheduling and cleanup. Alternatively or additionally, garbage collection may run inline with the write path, meaning as writes occur, old garbage can be cleaned up at the same time.

Any time a database writer 122 is adding or modifying a physical row during a transaction, it means there may be a superseded row (i.e., a versioned row in a lower transaction number) which will cleaned up if the transaction commits. If the transaction rolls back, then the physical versioned row created during the current transaction can be removed, and the superseded row is not cleaned up. To discover which versioned rows are to be cleaned up during garbage collection, one additional garbage collection row is added to the garbage collection rows 208 (see FIG. 2) of the key/value store for every physical data row in the data rows 204. For example, adding a logical row with two physical rows will also add two physical garbage collection data rows as follows:

| PartitionKey | RowKey | Otx | Del |
|---|---|---|---|
| [PartitionValue] | [Index1]:[Index1Val]:[TxVal] | | |
| [PartitionValue] | [Index2]:[Index2Val]:[TxVal] | | |
| [PartitionValue] | GC:[TxVal]:[Index1]:[Index1Val] | [Otx] | False |
| [PartitionValue] | GC:[TxVal]:[Index2]:[Index2Val] | [Otx] | True |

The last two rows ('GC') allows the garbage collection runner 120 to identify the older physical rows which have become stale as a result of the current transaction's commit, or the new physical rows which are cleaned up as a result of the current transaction's rollback. Note the 'TxVal' (indicating the current transaction) is a prefix to the index data in the GC rows, rather than a suffix. Also note that the GC:TxVal is not inverted, while the data row has an inverted TXVal.

The Otx column is populated if the new physical row supersedes an older physical row. It will not be present in cases where the physical row is legitimately new (like a new index value never seen before).

A special case exists where physical rows can become orphaned from the garbage collector. When a physical row is marked as deleted (Del=True), then there is no future transaction which will include this row's Otx in its GC structure. There are two example scenarios where this can occur. First an already existing logical row is modified, and certain indexes change values resulting in an index physical now to be marked as Del=True. In a second example, a row is modified multiple times in the same transaction, such that a physical row is added in a transaction, and then marked as Del=True in the same transaction.

The solution for both of these cases is the same. Whenever a data row enters the Del=True state, the corresponding GC row sets Del=True.

Note that in the second case above, a special case exists where a single transaction goes from an Del=True state, and then later to an Del=False state. In the first update (Del=True), there will be a GC row referencing the deleted row, with Del=True. When the 2nd update occurs (Del=False), the original GC row is modified to set Del=False. In-memory tracking can be used to track if the GC row is to be added or updated, based on what has already been written in the current transaction. Note this tracking exists either way, to determine if the regular data row is an add or an update.

The GC row is written atomically with its corresponding data row (such as in the same entity batch transaction in Azure storage available from Microsoft Corporation of Redmond, Wash.) as the regular key/value store rows.

When garbage collection operates, it chooses a transaction number to cleanup. This is done by the garbage collection scheduler 118. The garbage collection runner 120 removes stale data from the transaction numbers lower than the chosen transaction number, and in some cases removes stale rows equal to the transaction number (for example an uncommitted transaction can be fully cleaned up).

While in the illustrated example, a single transaction number value is being chosen for cleanup, the actual cleanup process will occur for a range of transaction number values. Specifically, transactions between the last successful cleanup and the chosen transaction number will be handled in a single garbage collection pass.

The garbage collection itself is performed by the garbage collection runner 120. To identify the rows to delete when cleaning up a particular transaction number (TxVal), the following query is made:

RowKey<='GC:[TxVal];' AND
RowKey>'GC:'

Note that using this process, the oldest transaction number (typically identified as the smallest transaction number) is cleaned up first.

The result of the query will return all GC rows for all transactions which are less than or equal to the cleanup transaction number for which garbage collection has not already occurred. For each GC row returned, cleanup will occur as follows:

If the transaction number is a committed transaction
        A physical rowkey for a corresponding row data can be formed based on the Otx column, if present, to remove the superseded row.
        If Del=True, a physical rowkey can be formed for a corresponding data row based on TxVal
    If the transaction number is an uncommitted transaction
        A physical rowkey can be formed for a corresponding data row based on TxVal
    The GC row itself is also be deleted Illustratively, from the table above:
Assuming TxVal is a committed transaction, the first GC row would result in the following deletes:
    [Index1]:[Index1Val]:[Otx]
    GC:[TxVal]:[Index1]:[Index1Val]

The second GC row would result in the following deletes (note the extra delete due to IsNowDeleted=1):
    [Index2]:[Index2Val]:[Otx]
    [Index2]:[Index2Val]:[TxVal]
    GC:[TxVal]:[Index2]:[Index2Val]

The GC row is deleted in the same entity batch transaction as the rows being deleted as a result of that row. While cleanup can be batched, it does not happen in parallel because older transactions are cleaned up first. This is done because of the deleted rows. If a newer deleted row is deleted before older rows, active readers could retrieve an older row version because they did not see the deleted row.

After there are no more rows to garbage collect, the transaction status row 212 can have its list of uncommitted transactions in the uncommitted transactions list 308 cleaned up. All transaction numbers<=the transaction number being cleaned up can be removed from the list.

While cleaning up the uncommitted transaction list 308 in the transaction status row 212 can contend with an active writer, other operations will not because writing to the transaction status row 212 will pre-empt an active writer (due to an ETAG change). As a result, garbage collection will skip this step if a write lease is declared, allowing the next pass to complete the cleanup.

There is a potential for a stuck state if the uncommitted transaction list column 308 is full, preventing new writers. The transaction status row can be stuck with a stale write lease that nobody is taking over. As such, some embodiments may implement garbage collection which writes to the transaction status row if the write lease value in the write lease column 304 is sufficiently old. While this would pre-empt an active writer if one is still active, this is very rare (and may be indicative of an unhealthy writer). Doing so would cause no permanent damage, but would fail the pre-empted writer.

The garbage collection algorithm above detaches the actual garbage collection algorithm from determining how much data to garbage collect and where the garbage collection itself executes. The garbage collection runner 120 takes as input a transaction number value, with the assumption that no readers or writers are currently active with a transaction number less than the specified transaction number, as guaranteed by the garbage collection scheduler 118.

It is the job of the garbage collection scheduler 118 to identify a safe transaction number, for garbage collection to operate against. This transaction number will determine how much data is actually garbage collected. Note that the garbage collection scheduling here is only identifying what garbage is safe to collect, and not the process of determining when and where the scheduling and execution of the garbage collection algorithm will run.

For the garbage collection Scheduler to identify a transaction number for garbage collection to operate against, several control rows are included in the transaction status rows 202 of the key/value store 108 (see FIG. 2).

The transaction status row 212 is the primary transaction control data structure.

The garbage collection consider row 214 is used to advertise that garbage collection is trying to be scheduled at a particular transaction number. In the example illustrated, there are two possible status values: 'Considering', and 'Delayed'. There is also a deadline, which indicates when the transaction number to consider will be scheduled. Active readers and writers can detect the presence of this row, and change the status from 'Considering' to 'Delayed', to delay garbage collection at that transaction number.

The garbage collection scheduled row 216 is used to indicate that the next garbage collection pass will run at the previously considered value. When a transaction number gets to this row, it is a guarantee that there are no more active readers/writers operating against the transaction number.

Below is an example. Consider the initial state:

| RowKey | | | |
|---|---|---|---|
| Txs:Tx | TxVal = 10 | Uncommitted Transactions | WriteLease |
| Txs:GC:Scheduled | TxReady = null | TxLastRun = null | |
| Txs:GC:Consider | TxValToConsider = null | Status = null | Deadline = null |

Then the garbage collection scheduler 118 decides to try scheduling garbage collection, at 1:00.

| RowKey | | | |
|---|---|---|---|
| Txs:Tx | TxVal = 10 | Uncommitted Transactions | WriteLease |
| Txs:GC:Scheduled | TxReady = null | TxLastRun = null | |
| Txs:GC:Consider | TxValToConsider = null | Status = Consider | Deadline = 1:10 |

Assume that it intends to do garbage collection 10 minutes later. If an active reader (or a writer doing a read) is still working against a transaction number<10, it will detect this current state by modifying the consider row 214. Note that the active transaction number can be rolling forward during this time period:

| RowKey | | | |
|---|---|---|---|
| Txs:Tx | TxVal = 15 | Uncommitted Transactions | WriteLease |
| Txs:GC:Scheduled | TxReady = null | TxLastRun = null | |
| Txs:GC:Consider | TxValToConsider = 10 | Status = Delayed | Deadline = 1:10 |

Then, the garbage collection scheduler 118 will check back later (at 1:10) to see if garbage collection can actually be scheduled. This can be later than 1:10, or earlier than 1:10. There is an advantage to executing the scheduler more frequently than the deadline interval, because if a reader/ writer sets status to 'Delayed', the scheduler can transition it back to 'Considering' (with a new deadline) more aggressively. It will notice the delayed status, and set it back to re-consider with a new deadline:

| RowKey | | | |
|---|---|---|---|
| Txs:Tx | TxVal = 25 | Uncommitted Transactions | WriteLease |
| Txs:GC:Scheduled | TxReady = null | TxLastRun = null | |
| Txs:GC:Consider | TxValToConsider = 10 | Status = Consider | Deadline = 1:20 |

If no active readers/writers come back to delay garbage collection, the garbage collection scheduler 118 can complete its job by finalizing the schedule. In this state, the next garbage collection run will operate against transaction number=10:

| RowKey | | | |
|---|---|---|---|
| Txs:Tx | TxVal = 35 | Uncommitted Transactions | WriteLease |
| Txs:GC:Scheduled | TxReady = 10 | TxLastRun = null | |
| Txs:GC:Consider | TxValToConsider = null | Status = null | Deadline = null |

The scheduling algorithm can continue to run, even when 'Txs:GC:Scheduled' already has a value.

The TxReady can be updated, even if it is not null. Nothing in the scheduler algorithm had to touch the 'Txs:Tx' row (i.e., the transaction status row 212). This makes its writes 'invisible' to any active writers, who may actively be bumping up the current transaction number.

The TxValToConsider did not change, throughout the Consider→Delayed→Consider transition. The reason is to avoid an overly active reader/writer from never settling on a stable transaction number to garbage collect.

Active readers/writers, when they are done with their operations, can be made to read the 'Txs:GC:Scheduled' row the schedule row 216). If the TxReady or TxLastRun columns contain a transaction number which is larger than the reader/writer's active transaction number, then alerts can be fired because the protection mechanisms have failed.

As noted above, active readers and writers participate in the garbage collector scheduler algorithm, to delay the execution of garbage collection if they would be impacted by the transaction number. A garbage collection renew interval is defined as a time interval where readers and writers check back with the transaction status rows 202. This can be done to confirm the Txs:GC:Consider value TxValToConsider is not greater than the transaction's transaction number. If it is, the status is set to delayed. In alternative embodiments, writers could do the check, to delay for greater-than-or-equal. But this should not be necessary, because TxValToConsider should not be set to the current transaction number when the WriteLease is held.

Readers and writers can also check back to confirm the Txs:GC:Scheduled values for TxReady and TxLastRun are not greater than the transaction's transaction number. The transaction should fail fatally, in this case The logic for checking is as follows, whenever reading or writing from the versioned rows of the key/value store 108:

```
if (GcIntervalRenewalTimeMet( ))
{
    DelayGc( );
}
DoReadOrWrite( );
if (GcIntervalRenewalTimeMet( ))
{
    DelayGc( );
}
```

GcIntervalRenewalTimeMet( ) will check against an internal timer, measuring the last time garbage collection was confirmed to not be marked as 'Consider' for an impacting a transaction number. If the garbage collection renewal interval has been met, it returns TRUE.

DelayGc( ) will read the Txs:garbage collection rows from Azure Table, and perform several checks. If TxReady or TxLastRun are set to an impacting transaction number, the call will fail fatally, because garbage collection has been scheduled and our protection mechanisms have failed. If TxValToConsider is set to an impacting transaction number and the Status is set to 'Consider', the internal timer tracking the row will be updated to set Status to 'Delayed'. The internal timer tracking the garbage collection Renewal Interval will also be reset.

The GcIntervalRenewalTimeMet( ) call and potentially the DelayGc( ) call are run after the DoReadOrWrite( ) function because an unknown amount of time could have passed between the first DelayGc( ) call and the DoReadOrWrite( ) call. This could be measured in minutes, if the system is massively overloaded or thrashing. The second call ensures that whatever was just read from the database cannot be used, if garbage collection run after the prior check. Writes would not need protection, due to the writer lock.

The algorithm above uses timing to help guarantee that no impacted active readers/writers exist, before a transaction number will be scheduled. Because the deadline is a timestamp, it is subject to clock skew.

Consider the following example, where two machines are both actively running the scheduler algorithm. In this example, Machine 1 is 5 minutes behind wall-clock time, and Machine 2 is 5 minutes ahead of wall clock time. In total, there is 10 minutes of clock skew.

| Actual Time | Machine 1 | Machine 2 | Notes |
|---|---|---|---|
| 1:05 PM | 1:00 PM | 1:10 PM | At this time, Machine 1 sets a TxValToConsider value, with a Deadline of 1:10 PM (10 minutes) |
| 1:06 PM | 1:01 PM | 1:11 PM | Machine 2 sees the 1:10 PM deadline. But since it sees 1:11 PM as current time, it moves the transaction number from TxValToConsider to TxReady. |

In the example above only one minute of wall clock time has gone by, but the garbage collection Scheduler algorithm has scheduled a transaction number to GC. The intention was to give active readers/writers 10 minutes to delay GC, but instead only 1 minute was given!

The following describes one mechanism to define a 'max potential drift', as an underlying clock skew assumption, and have the system safely schedule garbage collection. It should be appreciated that other mechanisms may be implemented in other embodiments. Consider the following definitions:

Max Potential Drift (D) The maximum timespan which a machine's clock can be tolerated as being incorrect, before data will become corrupt (because garbage collection is allowed to run too early)

Target Garbage Collection Interval The target timespan between when garbage collection is considered, and when it is scheduled to run safely. This value does not consider clock skew.

Garbage Collection Schedule Interval A logical timespan to determine when garbage collection can run, used to calculate the 'Deadline' column of the schedule. This accounts for skew across machines, and is calculated by: (D*2)+(Target garbage collection Interval).

Garbage Collection Renew Interval The interval which long-running readers/writers check the Txs:GC rows, to delay garbage collection scheduling. This is less than the 'Target garbage collection Interval'/2.

The following values are recommended:

| Name | Value | Notes |
| --- | --- | --- |
| Max Potential Drift (D) | 10 minutes | Accounts for 20 minutes of difference between machines. |
| Target garbage collection Interval | 3 days | Depending on the IO patterns of the system, the target interval can vary. |
| garbage collection Schedule Interval | 3 days, 20 minutes | Calculated. |
| garbage collection Renew Interval | 2 minutes | Good for this to be lower than necessary. |

Note the 'Target Garbage Collection Interval' is measured in days. This allows for a measuring a system where garbage collection is falling behind, or not being run. This is a defensive measure, so that garbage collection can be disabled for a period of time without bringing down the service, if critical data corruption bugs are being investigated. A three day interval would result in six days of data buildup in the worst case, with garbage collection cleaning up three days of garbage.

In some embodiments, the susceptibility to clock skew can be avoided by one machine in a data center performing a local time measurement. Because the begin and end timing of the deadline would be a local tick measurement, it would not be susceptible to clock skew.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
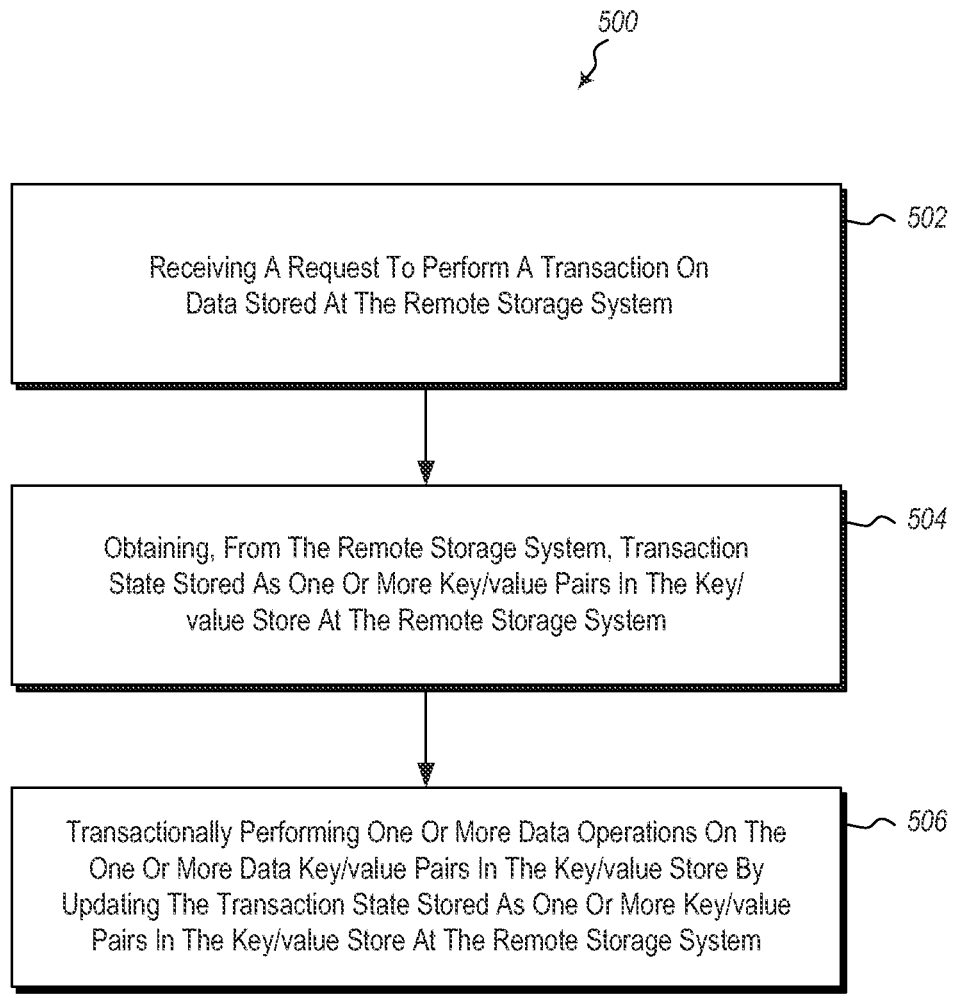
FIG. 5 illustrates a method of a method of performing a transaction on data using a database engine at a local system where the data stored is stored as one or more data key/value pairs at the remote storage system, by using transaction state stored as one or more key/value pairs at the remote storage system.

Referring now to FIG. 5, a method 500 is illustrated. The method 500 may be practiced in a computing environment including a plurality of local systems coupled to a remote storage system. The remote storage system comprises a key/value store. The method 500 includes acts for performing a transaction on data at a database engine at a local system on data stored as one or more data key/value pairs at the remote storage system. This can be done by using the key/value store to store transaction state for use by transaction logic at a local system when performing transactions on data stored at the remote storage system. In this way, transactions can be performed on the remote storage system with minimal transactional data processing logic used by the remote storage system The method 500 includes at the local system, receiving a request to perform a transaction on data stored at the remote storage system (act 502). For example, as illustrated in FIG. 1, the database engine 114 may receive a request from the database client 110 to perform a transaction on data in the key/value store 108.

The method 500 further includes obtaining, from the remote storage system, transaction state stored as one or more key/value pairs in the key/value store at the remote storage system (act 504). For example, the database engine 114 may obtain one or more of the transaction status rows 202 illustrated in FIG. 2.

The method 500 further includes transactionally performing one or more data operations on the one or more data key/value pairs in the key/value store by updating the transaction state stored as one or more key/value pairs in the key/value store at the remote storage system (act 506).

For example, updating the transaction state stored as one or more key/value pairs in the key/value store at the remote storage system may include updating a write lease field in the transaction state stored as one or more key/value rows in the key/value store at the remote storage system to indicate that the database engine has acquired a write lease on the one or more data key/value pairs. An example of this is illustrated above in FIG. 3 where the write lease column 304 is updated.

In an alternative or additional example, updating the transaction state stored as one or more key/value pairs in the key/value store at the remote storage system comprises updating a current transaction field in the transaction state stored as one or more key/value rows in the key/value store at the remote storage system to include an identifier identifying that the transaction has begun on data in the one or more data key/value pairs. An example of this is illustrated above in FIG. 3, where the current transaction column 306 is updated.

In an alternative or additional example, updating the transaction state stored as one or more key/value pairs in the key/value store at the remote storage system comprises updating an uncommitted transaction field in the transaction state stored as one or more key/value rows in the key/value store at the remote storage system to at least one of add or remove one or more identifiers identifying the transaction as being an uncommitted transaction on data in the one or more data key/value pairs. An example of this is illustrated above in FIG. 3, where the uncommitted transaction column 308 is updated.

The method may further include committing the transaction on data in the one or more data key/value pairs by updating the transaction state stored as one or more key/value pairs in the key/value store at the remote storage system from the remote storage system. For example, this may include committing the transaction on data in the one or more data key/value pairs by removing an identifier identifying the transaction as being an uncommitted transaction on data in the one or more data key/value pairs. As illustrated above, removing an identifier identifying a transaction from the uncommitted transaction column 308 causes that transaction to become durable as a row in the versioned rows 204 (see FIG. 2) then has valid committed data that can be used by a subsequent transaction.

The method 500 may further include determining that the transaction on data in the one or more data key/value pairs should be aborted and rolled back, and as a result, preventing updating an uncommitted transaction field in the transaction state stored as one or more key/value rows in the key/value store at the remote storage system. This prevents removal of an identifier identifying the transaction as being an uncommitted transaction on data in the one or more data key/value pairs. This can be used to prevent subsequent transactions from using a row in the versioned rows 204 essentially invalidating the data in the row. In particular, any later transaction will not use data from a versioned row that was created by an earlier transaction, if that earlier transaction is indicated as being uncommitted in the array in the uncommitted transaction field.

The method 500 may further include receiving a notification that a different computing system has begun a transaction on data in the one or more data key/value pairs, but that the transaction has not been committed or aborted; and as a result, using the transaction state stored as one or more key/value pairs in the key/value store at the remote storage system to resume the transaction including at least one of performing data operations on the data in the one or more data key/value pairs, aborting the transaction, or committing the transaction. Thus for example the local system 102-2 may have a database engine that began a transaction in the fashion indicated previously herein. The local system 102-2 may not complete the transaction, but may indicate to the local system 102-1 that it should complete the transaction. If the local system 102-1 knows the transaction identifier (which it could receive, for example form the local system 102-2), then the local system 102-1 can use transaction state, such as the transaction state in the transaction status rows 202, to complete the transaction. Completing the transaction may include updating at least one key/value pair in the versioned rows 204, committing the transaction (such as by updating the transaction state as indicated above for committed transactions) or aborting the transaction (such as by preventing removal of transaction identifiers from an uncommitted transaction list).

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system for performing transactions utilizing a key/value store the system comprising:
    a remote storage system that includes the key/value store;
    a first local database client comprising an interface configured to allow a user to request database operations using the first local database client;
    a remote database engine coupled to the first local database client, the remote database engine being configured to perform the following:
        receive requests for database operations from the first local database client;
        upon receiving a request from the first local database client, perform a database operation associated with the request to obtain and operate on a transaction state stored as one or more key/value pairs in the key/value store at the remote storage system; and
        transactionally perform data operations, using the transaction state received from the remote storage system, on data stored at the remote storage system as one or more data key/value pairs in the key/value store; and
    a second local database client configured to resume database operations, requested by the first local database client, that the remote database engine has begun to perform but that have not been committed or aborted, wherein the second local database client is configured to the following:
        receive an indication from the first local database client that the second local database client should complete a particular database operation that has been begun by the remote database engine but that has not been committed or aborted;
        use the transaction state from the remote storage system to resume the particular database operation without rolling back the transaction state of the particular database option; and
        complete the particular database operation including updating at least one key/value pair in the key/value store to indicate that the particular database operation has been committed;
    wherein the database engine is configured to update a write lease field in the transaction state stored as one or more key/value rows in the key/value store at the remote storage system to indicate that the database engine has acquired a write lease on the one or more data key/value pairs.

2. A method, executed at a computing system comprising one or more processors, for resuming, at a second local system, a transaction begun at a first local system, the method comprising:
    at the second local system, receiving a request to perform a transaction on data stored at a remote storage system that includes a key/value store;
    obtaining, from the remote storage system, a transaction state stored as one or more key/value pairs in the key/value store, wherein the obtained transaction state includes an indication that a first local system has begun the transaction on the data in the one or more data key/value pairs, and that the transaction has not been committed or aborted; and
    based on receiving the request, use the obtained transaction state without rolling back the transaction begun at the first local system to resume the transaction begun at the first local system, including performing one or more additional data operations on the data stored as one or more data key/value pairs in the key/value store by updating the transaction state stored as one or more key/value pairs in the key/value store at the remote storage system;
    wherein updating the transaction state stored as one or more key/value pairs in the key/value store at the remote storage system comprises updating a write lease field in the transaction state stored as one or more key/value rows in the key/value store at the remote storage system to indicate that the second local system has acquired a write lease on the one or more data key/value pairs.

* * * * *